April 20, 1943.   B. N. DAVIS   2,316,936
ANTITHEFT DEVICE
Filed June 9, 1942   2 Sheets-Sheet 1
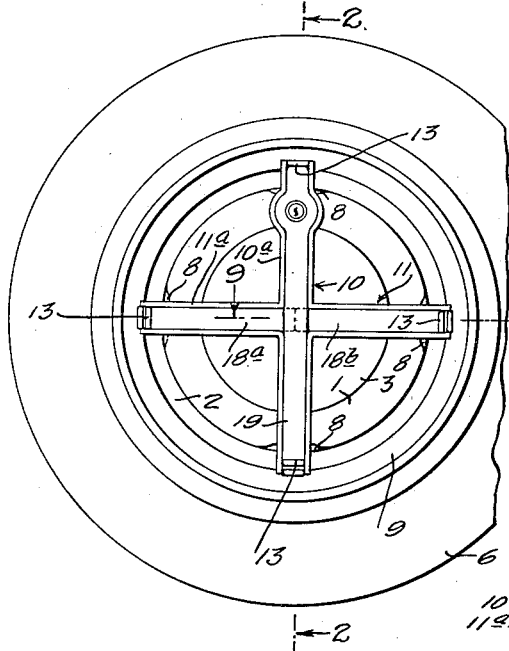
INVENTOR
BEMISS N. DAVIS
BY
ATTORNEY April 20, 1943.　　　B. N. DAVIS　　　2,316,936
ANTITHEFT DEVICE
Filed June 9, 1942　　　2 Sheets-Sheet 2
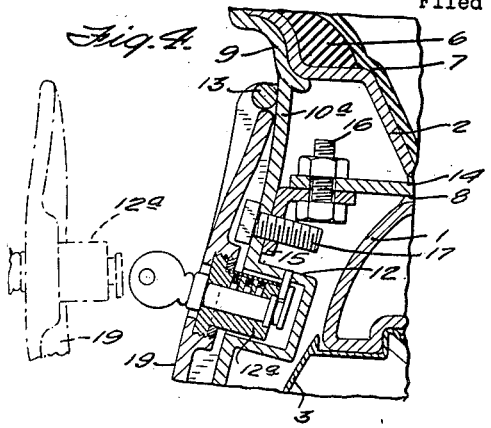
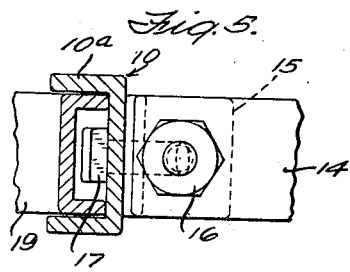
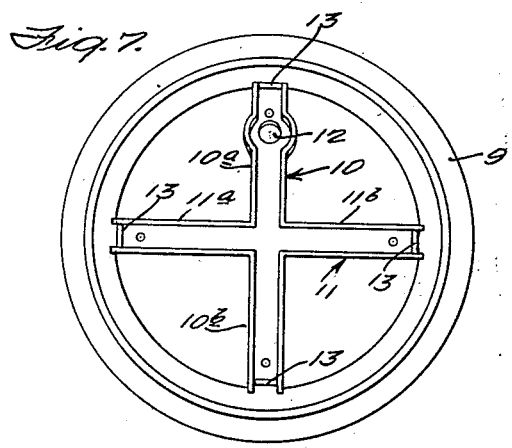
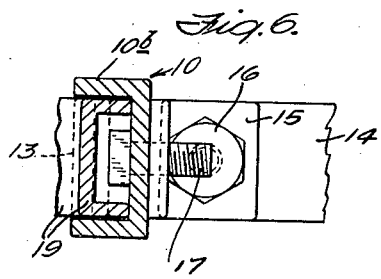
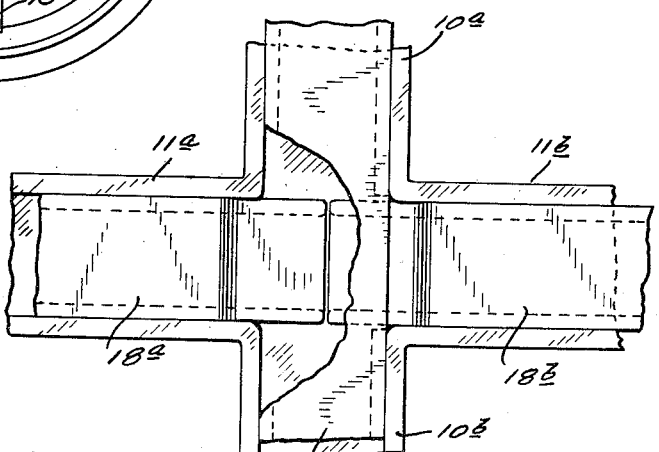
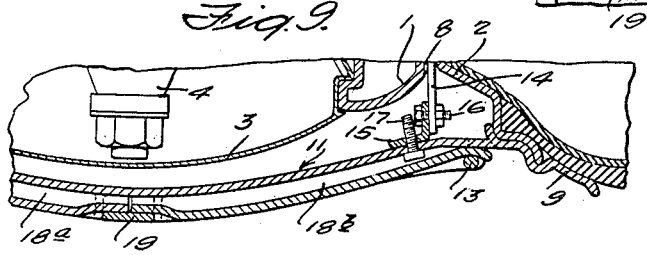
INVENTOR
BEMISS N. DAVIS
BY
ATTORNEY Patented Apr. 20, 1943

2,316,936

UNITED STATES PATENT OFFICE 2,316,936

ANTITHEFT DEVICE

Bemiss N. Davis, New Orleans, La.

Application June 9, 1942, Serial No. 446,335

8 Claims. (Cl. 70—259)

The purpose of this invention is to guard against the theft of automobile tires by rendering it impossible to remove the tires from the wheels while the wheels are on the axles. When this purpose is accomplished it is only necessary to lock the wheels on the hubs to safeguard the tires.

Fundamentally the principle involves making the outside flange of the metallic rim on which the tire is mounted of sufficiently larger diameter than that of the inner flange so that the tire cannot be removed over the outer flange. So long as the wheel is on the axle it is of course futile to remove the tire over the inner flange, and in this way theft of tires is effectively prevented.

It is manifest that in order to make the invention applicable to standard rims the extension may be a separate annulus applied to the wheel and fitting upon and extending beyond the rim and forming an auxiliary rim.

When this auxiliary rim is made a separate member it is expedient to fasten it on the wheel in the manner disclosed in my copending application Serial No. 432,175 filed February 25, 1942, now Patent No. 2,292,206, dated August 4, 1942, namely, by means of straps that pass through the holes usually provided around the hub for emergency chains or through holes provided especially for the purpose and hook upon the hub or other portion of the wheel with their rear ends and attach with their front ends to a bar extending across the face of the hub.

An advantage of this rim extension in addition to its safeguarding the tire against theft is the fact that it provides a support for the wheel in case of tire deflation, and thus will protect the tire from the weight of the car in case it is necessary under such condition to roll the wheel.

The invention is illustrated in the drawings embodied in the form of both the separate and the integral rim extension.

Fig. 1 is a front elevation with part broken away of a tire equipped wheel with the invention in the form of a separate auxiliary rim applied thereto.

Fig. 2 is a median transverse section of the same on enlarged scale, on the line 2—2 of Fig. 1.

Fig. 3 is a fragmentary view in front elevation of a portion of the top of the wheel and of the anti-theft mechanism.

Fig. 4 is a transverse section on enlarged scale of a portion of the parts shown in Fig. 3 on line 4—4 thereof.

Fig. 5 is an enlarged sectional detail on line 5—5 of Fig. 2.

Fig. 6 is an enlarged sectional detail on line 6—6 of Fig. 2.

Fig. 7 is a front elevation of the guard device with the cover bars removed.

Fig. 8 is an enlarged detail in front elevation of the central portion with short sections of the radiating arms and of the cover bars, with the long bar partially broken away to exhibit the inner ends of the short cover bars.

Fig. 9 is an enlarged fragmentary section on line 9—9 of Fig. 1.

The construction shown in Figs. 1 to 9, inclusive, will now be described.

The automobile wheel shown in the drawings is of the type in which a shaped sheet metal hub member 1 completely occupies the space inside the rim 2, and has a removable hub cap 3 which covers the inner hub 4 and the lug nuts 5 that secure the wheel to the axle. The tire consisting of the shoe 6 and the inner tube 7 is disposed on the rim 2.

The hub member 1 is shown as provided with four equally spaced openings 8 about its periphery. As stated above these holes are commonly formed in the construction of the wheel, but in case they are not such holes may be easily made.

The guard member in this embodiment consists of an annular metal plate member 9 constituting a supplemental or auxiliary rim, and the internal metallic cross bars 10 and 11 which span the inner periphery of the auxiliary rim and are integrally attached thereto, as by welding. The cross bars meet at right angles and thus form four equal arms or bar sections 10a and 10b, and 11a and 11b radiating from a common center.

The annular member 9 is shaped in transverse cross-section so that it fits upon the outer flange of the wheel rim 2 and has a portion extending outwardly beyond the rim in opposition to the front face of the tire, preferably out of contact therewith. The diameter is properly selected to prevent removal of the tire and also to allow the auxiliary rim to assume the support of the wheel in case of deflation of the tire.

The cross bars 10 and 11 are made in the form of outwardly facing channel members, and the arm 10a is provided with a lock cylinder 12 near its outer end. If desired a counterbalancing member (not shown) may be provided on the arm 10b.

The channel sides of the arms continue out to the juncture of the arms with the annular member 9 and at their outer ends the flanges are bridged by strips of metal 13. Those of the arms 11a, 11b and 10a are raised to provide loops for a purpose which will presently appear.

The guard structure is supported in the central position shown by four retaining members 14, three of which appear in the drawings. These retaining members are metallic straps that pass through the openings 8 and are secured at their front ends to the respective arms of the cross bars and are shaped to engage the rear of the wheel so as to limit their forward movement. In the form shown the rear ends of the straps are bent at an angle to provide a hook 14a that engages over the rear edge of the hub drum.

To fasten the front ends of the retaining straps 14 to their respective cross-bar arms, securing means are provided which are protected from unauthorized removal. In the form shown an angle plate 15 serves as a coupling member for each strap. The strap is attached to one leg of the plate by a bolt 16 the head of which lies within the angle of the plate, and the bar section or arm is attached to the other leg of the plate by a screw 17 which is threaded through the bar and plate and extends across the head of the bolt 16 so as to interfere with and prevent the removal of the bolt. These two securing members therefore have to be inserted in one order and removed in the reverse order.

Since the screws 17 are the members that have to be taken out first in disassembling the mechanism, lockable means are provided to prevent unauthorized removal of the screws. As shown these consist of cover bars that go within the channels of the cross bars and cover the heads of the four screws 17. Conveniently they may also be channel members fitting within the flanges of the cross bars with their bases out, and they are so shown.

The cover bar of the cross bar 11 is made in two equal sections 18a and 18b, and the outer ends of these sections are shaped to engage under the loops formed by the strips 13, as shown for instance in Fig. 9. The cover bar 19 for the cross bar 10 is a single, full length bar and has its one end also shaped to engage under the loop 13 at the end opposite the lock end, and it covers the inner ends of the cover bars 18a and 18b when the cover bars are in place, as shown. To permit of this the inner ends of the short cover bars are thinned down so as to go under the cover bar 19, the flanges of which are interrupted for this purpose, as appears in Figs. 2, 8 and 9.

It is thus evident that the cover bar 19 must be removed to release the transverse sectional cover bars. To guard against unauthorized removal the cover bar 19 is made to lock in place by a key operated plug 12a that registers with the lock cylinder 12 when the bar is in place. The unlocked and lifted condition of the bar is shown by dotted lines in Fig. 4.

The channel bar construction affords added strength and prohibits the insertion of a prying tool between the bars to break the loops or the lock. The cross strip 13 at the lock end of the bar 10 is shown as placed upon the base instead of being raised to form a loop as are the other strips 13, since no loop is needed at that end, and thus the channel end is closed to the exclusion of a tool which might otherwise be inserted in that end underneath the cover bar in an effort to break the lock.

It is obvious that the invention may be otherwise embodied and therefore it is the intention that the invention be not limited to the constructions shown in the drawings and above particularly described, but only as pointed out in the following claims.

I claim:

1. For automobile wheels including rims and pneumatic tires disposed thereon, guard means comprising an annular plate forming an auxiliary rim member proportioned to overlie a portion of a tire outside the rim when applied upon the outer face of the wheel coaxially with the rim, a bar diametrally spanning the inner periphery of the auxiliary rim and secured at its ends thereto, two retaining members adapted to extend through the wheel and engage in the rear thereof against forward displacement, means for securing the bar at its opposite ends to the respective retaining members, means for preventing access to the securing means to remove the same, and means to lock the access preventing means.

2. For automobile wheels including rims and pneumatic tires disposed thereon, guard means comprising an annular plate forming an auxiliary rim member proportioned to overlie a portion of a tire outside the rim when applied upon the outer face of the wheel coaxially with the rim and shaped to fit upon the rim with its inner portion, a bar diametrally spanning the inner periphery of the auxiliary rim and secured at its ends thereto, two retaining members adapted to extend through the wheel and engage in the rear thereof against forward displacement, an angle plate for securing each retaining member to the bar at respectively opposite ends thereof, removable attaching means between the plate and the front end of the respective retaining member, securing means passing through the bar and plate in position to prevent removal of the attaching means, and a locking member locking the securing means in place.

3. For automobile wheels including rims and pneumatic tires disposed thereon, guard means comprising an annular plate forming an auxiliary rim member proportioned to overlie a portion of a tire outside the rim when applied upon the outer face of the wheel coaxially with the rim and shaped to fit upon the rim with its inner portion, a bar diametrally spanning the inner periphery of the auxiliary rim and secured at its ends thereto, two retaining members adapted to extend through the wheel and engage in the rear thereof against forward displacement, an angle plate for securing each retaining member to the bar at respectively opposite ends thereof, removable attaching means between the plate and the front end of the respective retaining member, securing means passing through the bar and plate in position to prevent removal of the attaching means, a cover bar fitted to the outer face of the aforesaid bar in covering relation to the securing means, and means for locking the two bars together.

4. For automobile wheels including rims and pneumatic tires disposed thereon, guard means comprising an annular plate forming an auxiliary rim member proportioned to overlie a portion of a tire outside the rim when applied upon the outer face of the wheel coaxially with the rim and shaped to fit upon the rim with itis inner portion, a bar diametrally spanning the inner periphery of the auxiliary rim and secured at its ends thereto, two retaining members adapted to extend through the wheel and engage in the rear thereof against forward displacement, an angle plate for securing each retaining member to the bar at respectively opposite ends thereof, removable attaching means between the plate and the front end of the respective retaining member, two screws threaded through the bar and respective plates and extending inwardly in position to prevent removal of the respective attaching means, a cover bar fitted to the outer face of the aforesaid bar in covering relation to the heads of the screws, and means to lock the two bars together.

5. For automobile wheels including rims and pneumatic tires disposed thereon, guard means comprising an annular plate forming an auxiliary rim member proportioned to overlie a portion of a tire outside the rim when applied upon the outer face of the wheel coaxially with the rim, two diametral cross bars spanning the inner periphery of the auxiliary rim and secured at their ends thereto, four circumferentially spaced retaining members adapted to extend through the wheel in position to be secured to the ends of the respective cross bars and to engage in the rear of the wheel against forward displacement, an angle plate for securing each retaining member to its respective cross bar, removable attaching means between each plate and the front end of its retaining member, securing means passing through the bar and plate in position to prevent removal of the attaching means, crossed cover bars fitted to the outer faces of the cross bars in covering relation to the securing means, and means for locking the cover bars to the cross bars.

6. For automobile wheels including rims and pneumatic tires disposed thereon, guard means comprising an annular plate forming an auxiliary rim member proportioned to overlie a portion of a tire outside the rim when applied upon the outer face of the wheel coaxially with the rim, two diametral cross bars spanning the inner periphery of the auxiliary rim and secured at their ends thereto, four circumferentially spaced retaining members adapted to extend through the wheel in position to be secured to the ends of the respective cross bars and to engage in the rear of the wheel against forward displacement, means accessible from the front of the bars for securing the four radiating bar sections to the respective retaining members, an integral loop on the outer face of three of the bar sections near the outer ends thereof and a lock on the fourth section, and cover bars engageable under the respective loops in covering relation to the securing means and having a key controlled member engageable with the lock.

7. For automobile wheels including rims and pneumatic tires disposed thereon, guard means comprising an annular plate forming an auxiliary rim member proportioned to overlie a portion of a tire outside the rim when applied upon the outer face of the wheel coaxially with the rim, two diametral cross bars spanning the inner periphery of the auxiliary rim and secured at their ends thereto, four circumferentially spaced retaining members adapted to extend through the wheel in position to be secured to the ends of the respective cross bars and to engage in the rear of the wheel against forward displacement, means accessible from the front of the bars for securing the four radiating bar sections to the respective retaining members, an integral loop on the outer face of three of the bar sections near the outer ends thereof and a lock on the fourth section, two short cover bars engageable under the loops of one cross bar and of a length substantially to meet at the center, and a full length cover bar engageable under the loop on the other cross bar and overlying the adjacent ends of the short bars and having manipulatable means to engage the lock, the cover bars rendering the securing means inaccessible when in place.

8. For automobile wheels including rims and pneumatic tires disposed thereon, guard means comprising an annular plate forming an auxiliary rim member proportioned to overlie a portion of a tire outside the rim when applied upon the outer face of the wheel coaxially with the rim, two diametral cross bars spanning the inner periphery of the auxiliary rim and secured at their ends thereto, four circumferentially spaced retaining members adapted to extend through the wheel in position to be secured to the ends of the respective cross bars and to engage in the rear of the wheel against forward displacement, an angle plate for securing each retaining member to its respective cross bar section, removable attaching means between each plate and the front end of its retaining member, securing means passing through the several bar sections from the front thereof and the respective plates in position to prevent removal of the attaching means, an integral loop on the outer face of three of the bar sections near the outer ends thereof and a lock on the fourth section, and cover bars engageable under the respective loops in covering relation to the securing means and having a key controlled member engageable with the lock.

BEMISS N. DAVIS.